Sept. 2, 1924.  
H. RUEHMAN  
1,507,090
HIGH COMPRESSION TWO-CYCLE ENGINE
Filed May 14, 1923  5 Sheets-Sheet 4
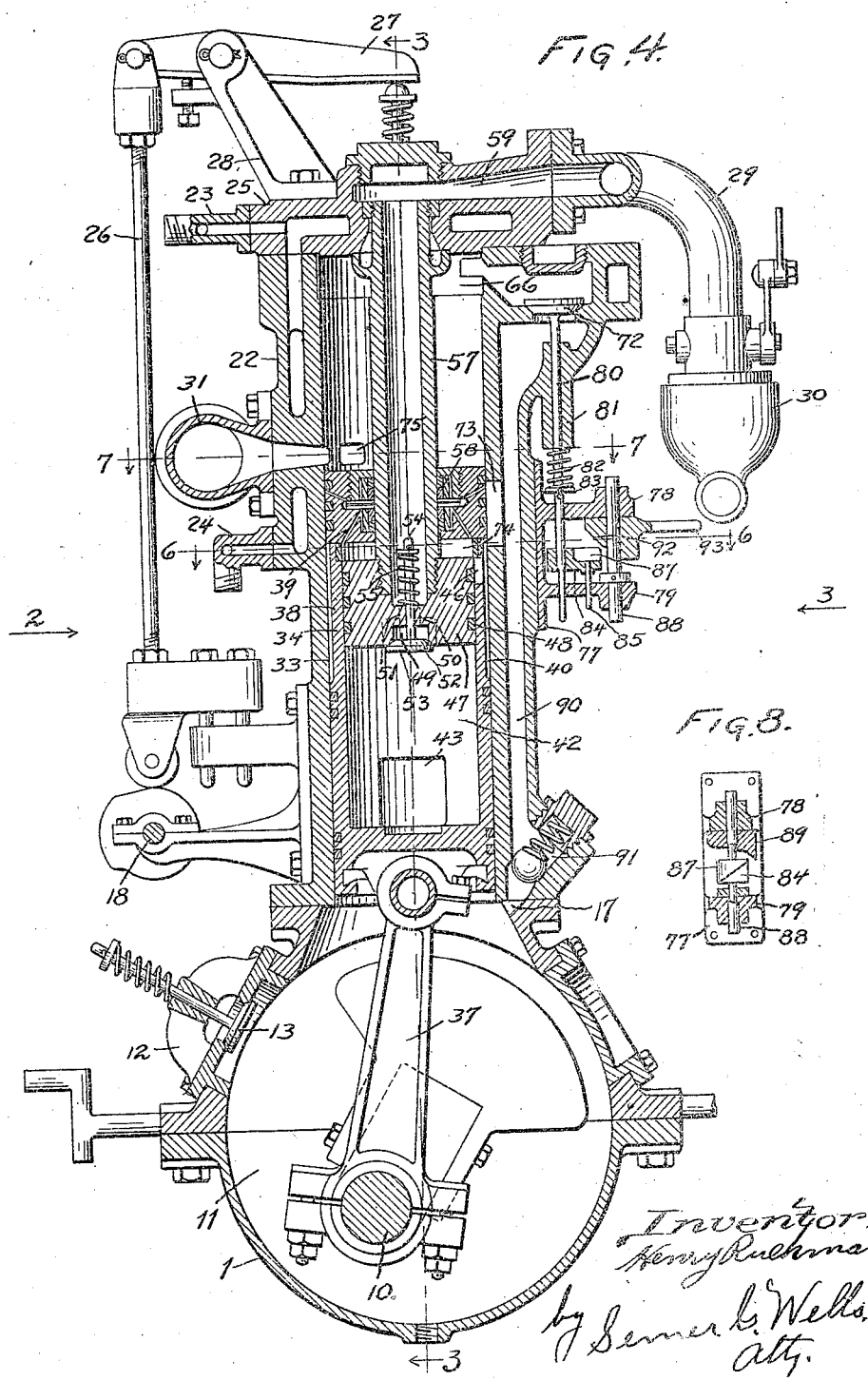

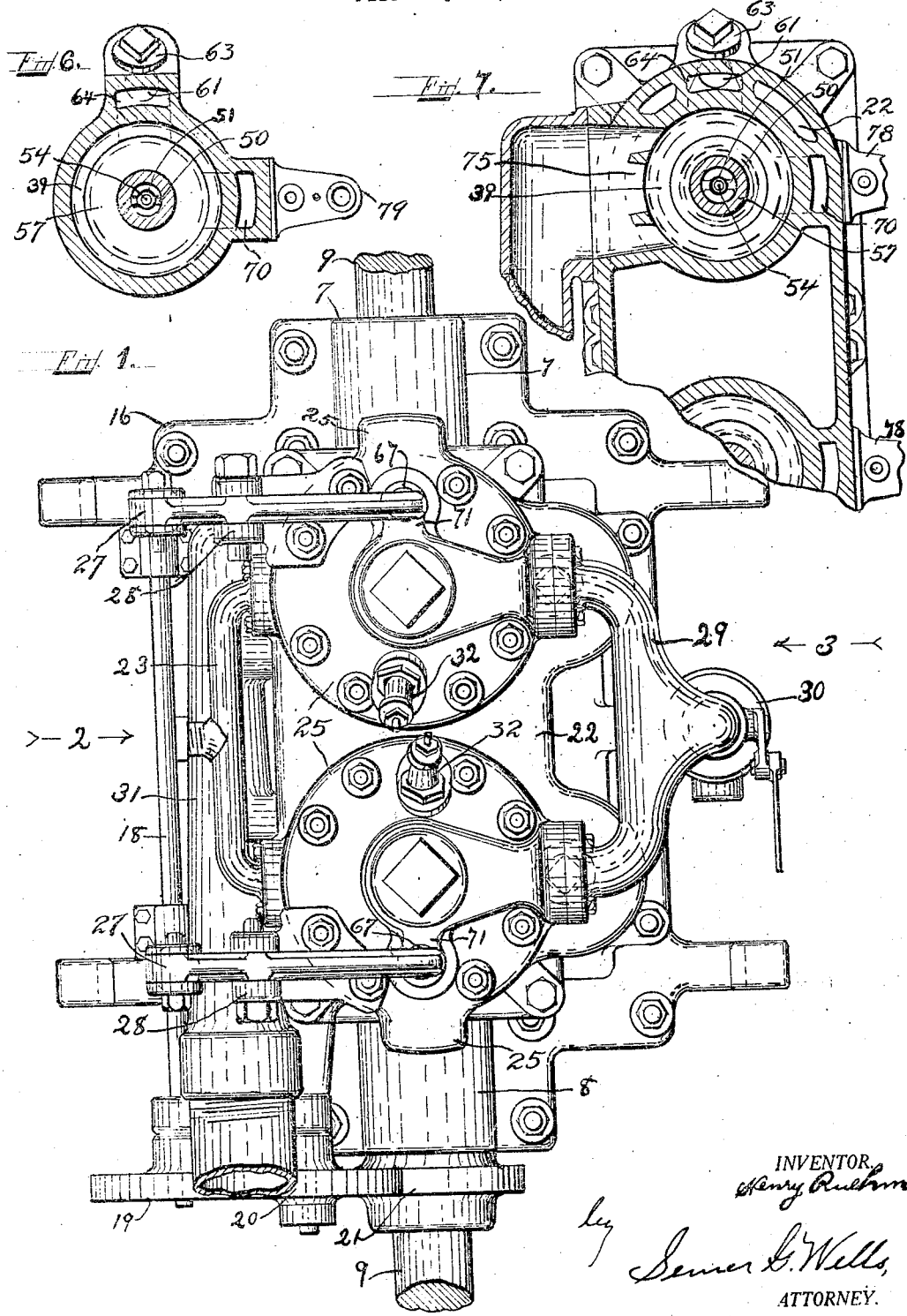

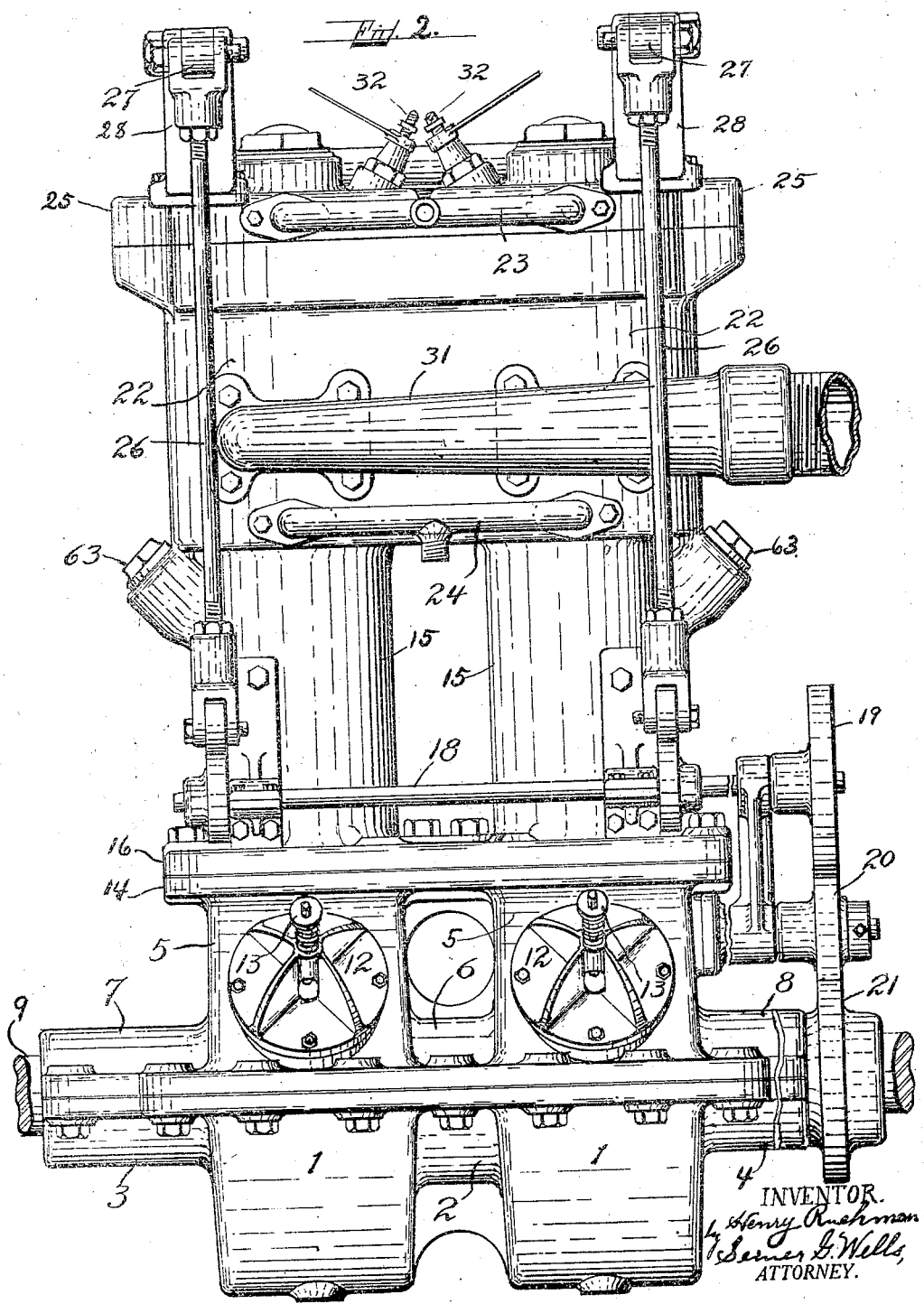

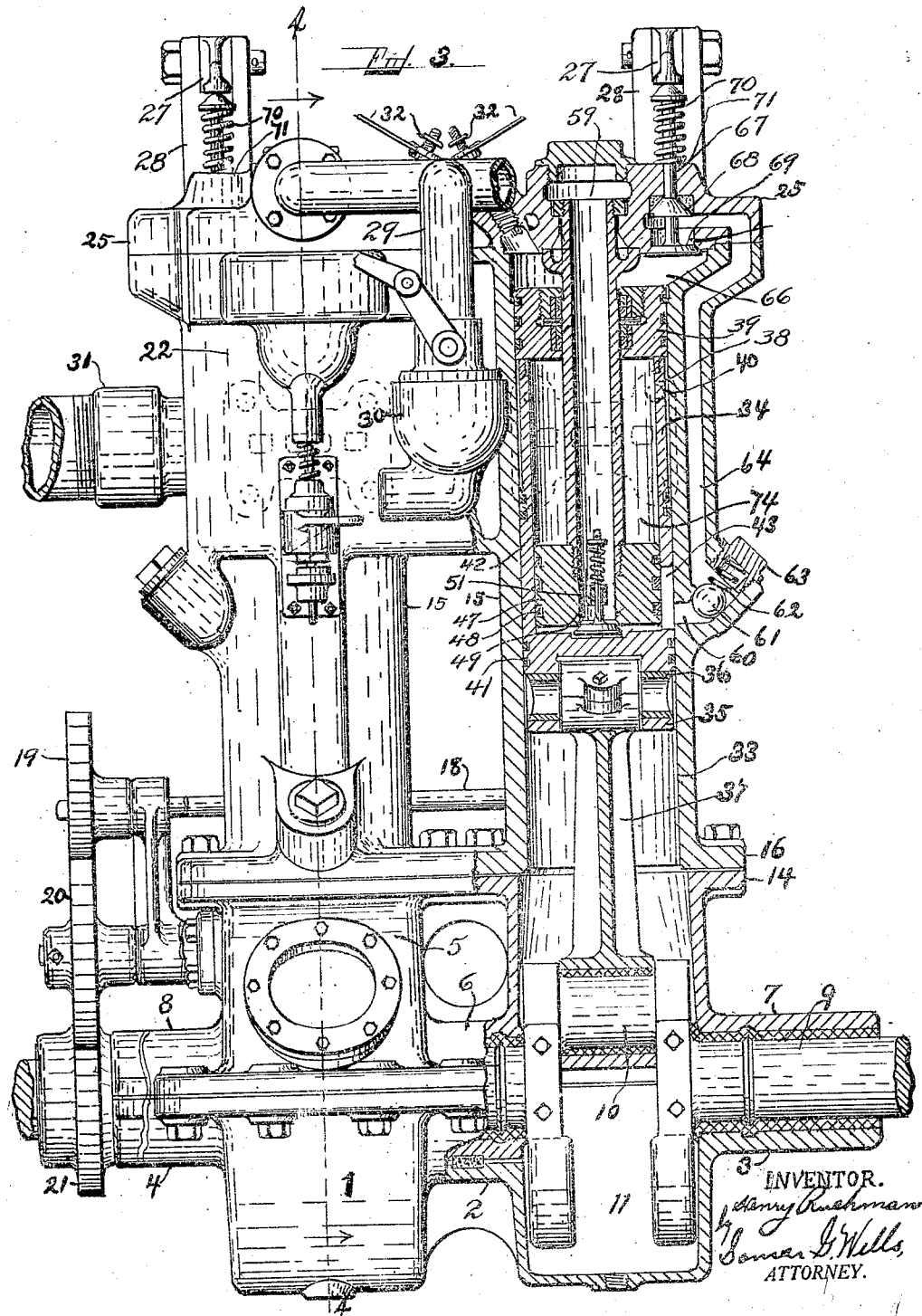

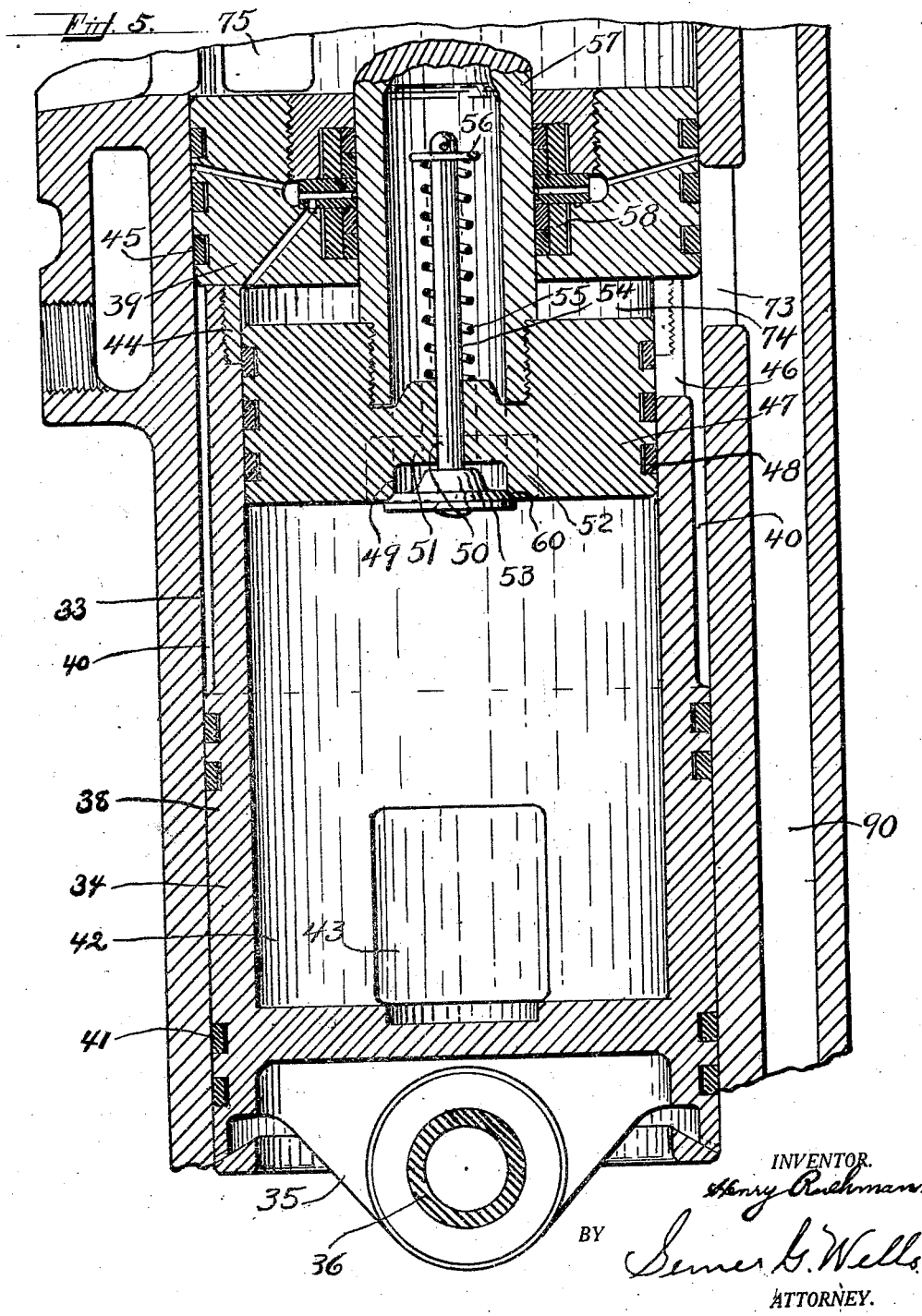

Patented Sept. 2, 1924.

1,507,090

UNITED STATES PATENT OFFICE.

HENRY RUEHMAN, OF LOS ANGELES, CALIFORNIA.

HIGH-COMPRESSION TWO-CYCLE ENGINE.

Application filed May 14, 1923. Serial No. 638,867.

*To all whom it may concern:*

Be it known that I, HENRY RUEHMAN, a citizen of the United States, residing at Los Angeles, Calif., have invented a certain new and useful High-Compression Two-Cycle Engine, of which the following is a specification.

My invention relates to internal combustion engines and consists of the novel features herein shown, described and claimed.

My object is to make a high compression two cycle engine.

Fig. 1 is a top plan view of a two cylinder two cycle engine of high compression in accordance with the principles of my invention.

Fig. 2 is a side elevation looking in the direction of the arrows 2 in Figs. 1 and 4.

Fig. 3 is a view looking in the direction of the arrows 3 in Figs. 1 and 4, and showing one cylinder in elevation and the other cylinder in section as on the line 3—3 of Fig. 4.

Fig. 4 is a vertical cross section on the line 4—4 of Fig. 3.

Fig. 5 is an enlarged fragmentary sectional detail on the same plane as Fig. 4.

Fig. 6 is a fragmentary horizontal sectional detail on the line 6—6 of Fig. 4.

Fig. 7 is a fragmentary horizontal section on the line 7—7 of Fig. 4.

Fig. 8 is a sectional detail on the line 8—8 of Fig. 4.

The lower half of the crank case consists of the two half crank pockets 1, a half crank bearing 2 connecting the pockets 1, and half crank bearings 3 and 4 extending outwardly from the pockets. The upper half of the crank case consists of the two half crank pockets 5 fitting the pockets 1, a half crank bearing 6 connecting the pockets 5 and half crank bearings 7 and 8 extending outwardly from the pockets. The crank shaft 9 is mounted in the crank case and has two cranks 10 operating in the two chambers 11 formed by the pockets, the chambers being separate and of the smallest practicable area. Hand holes constructions 12 provide access to the chambers and carry inlet check valves 13. A flange 14 is formed at the tops of the pockets 5. The two cylinders 15 are cast en bloc and have a flange 16 matching the flange 14. Ports 17 lead from the chambers 11. The cam shaft 18 is mounted above the flange 16 and connected to the crank shaft 9 by gears 19, 20 and 21. Water jackets 22 are cast upon the upper ends of the cylinders 15 and water circulates to and from the jackets through manifolds 23 and 24. The cylinder heads 25 fit upon the cylinders 15, said cylinder heads having water jackets joining with the water jackets 22 and the water manifold 23 being attached to the cylinder heads. The valve rods 26 are operated by the cam shaft 18 and operate the rockers 27 supported by brackets 28 secured to the cylinder heads 25. The fuel intake manifold 29 is secured to the cylinder heads and the carburetor 30 is connected to the intake manifold 29. The exhaust manifold 31 is secured to the cylinders 15 at the bottoms of the explosion chambers. The spark plugs 32 are tapped into the cylinder heads.

The cylinders 15 are identical, except that they are right and left handed, and the pistons, valves, etc., are identical. The cylinder bores 33 are straight and form the primary piston chambers and the primary pistons 34 operate in the bores. Bearings 35 extend downwardly from the pistons 34, wrist pins 36 are inserted through the bearings 35 and through the upper ends of the connecting rods 37, the lower ends of the connecting rods 37 being mounted upon the cranks 10. The pistons 34 each consist of two main pieces 38 and 39. The upper half of the piece 38 is reduced in size thus forming the annular port 40 and piston rings 41 are placed upon the lower half of the piece. The piece 38 is bored from its upper end to form the secondary piston chamber 42, there being a lateral port 43 at the lower end of the chamber 42. The upper end of the chamber 42 is enlarged and tapped and the piece 39 has a flange 44 screwed into the tapped end. Piston rings 45 are placed upon the piece 39. A port 46 leads from the upper end of the chamber 42 to the chamber 40. A secondary piston 47 operates in the chamber 42 and has piston rings 48. A gas intake port 49 is formed through the axial center of the piston 47, a bridge 50 carrying a bearing 51 extends across the port 49 above its lower end and the lower end of the port is finished to form a valve seat 52. A valve 53 fits the valve seat 52, a valve stem 54 extends from the valve 53 through the bearing 51, a spring 55 rests upon the bearing around the valve stem 54, and a spring seat 56 is secured to the valve stem against the spring. A hollow stem 57 is secured down into the secondary piston 47 and communicates with the port 49. The hollow stem 57 extends slidingly through the piece 39, there being an internal piston ring construction 58 in the piece 39 around the stem 57.

The upper ends of the hollow stems 57 extend into the cylinder heads 25 and are rigidly secured, and ports 59 connect the intake manifold 29 to the hollows of the stems, and the stems hold the secondary pistons 47 stationary while the primary pistons 34 reciprocate. Gas ports 60 lead outwardly from the chambers 33 in the planes of the bottoms of the secondary pistons 47, and in positions to register with the ports 43 when the primary pistons 34 are up. Inclined openings are bored at the outer ends of the ports 60, ball checks 61 are inserted, springs 62 are placed against the balls, and plugs 63 are screwed in against the springs. Conduits 64 lead upwardly from the check valves. The fuel intake ports 65 connect with the conduits 64 and discharge into the explosion chambers 66, which are the portions of the chambers 33 above the primary pistons 34. The ports 65 have valve seats at their lower ends and packing seats at their upper ends. The valve stems 67 have valve heads 69 fitting upwardly against the valve seats and balancing heads 68 fitting upwardly against the packing. The upper ends of the ports 64 are between the valves 69 and the balancing heads 68 so as to make balanced valves. The stems 67 extend through the cylinder heads and have springs 70 and spring seats 71 to hold the valves yieldingly closed. The rockers 27 engage the stems 67 and open the valves at the right time. When the primary pistons 34 go down fuel is sucked from the carburetor past the valves 53 into the chambers 42 and when the primary pistons go up this gas is held and compressed until the ports 43 register with the ports 60 and then the compressed gas raises the check valves 61 and passes into the conduits 64 and the valves 69 are opened by the cam shaft 18 and the fuel passes into the explosion chambers 66. The balanced valves 69 will not be opened by pressure confined in the conduit 64 owing to the balancing head. The fuel gas is fed into the explosion chambers during the compression strokes and compressed gas will be held between the valves in the conduits 64 ready for the next intake.

Air conduits 90 lead from the crank case chambers 11 through the ports 17 to the tops of the explosion chambers 66, there being check valve constructions 91 at the lower ends of the conduits 90 and intake valve constructions 72 at the upper ends of the conduits. Ports 73 lead through the walls of the cylinders 15 to connect the chambers 40 to the conduits 90 and the ports 46 connect the air compressing chambers 74 to the chambers 40, said chambers 74 being the portions of the bores 42 which are between the secondary pistons 47 and the pieces 39 of the primary pistons 34. When the primary pistons 34 go up air will be drawn through the valves 13 into the crank case chambers 11 and into the chambers 74, thus making practically two intakes of air, and the compression in the explosion chambers 66 will hold the valves 72 closed while the explosions take place. Exhaust ports 75 lead through the walls of the cylinders 15 at the bottoms of the explosion chambers to the exhaust manifolds 31. When the explosions force the primary pistons down the air in the chambers 11 and 74 is compressed until the ports 75 are opened and then the compressed air will open the valves 72 and rush into the tops of the explosion chambers and scavenge the chambers through the ports 75, and then the ports 75 close and hold the air and the valves 69 open and admit the fuel gas.

Air controllers 76 are adapted to resist the opening of the valves 72 more or less as manually operated, and the details of one controller are as follows: An attaching plate 77 is secured to a cylinder 15 and brackets 78 and 79 extend from the plate 77. The valve stem 80 of a valve 72 extends through a bearing 81, through a spring 82, through a spring seat 83 pinned upon the stem and through the brackets 78 and 79. The spring 82 is exerted to hold the valve yieldingly closed. The cam block 84 is fixed upon the stem 80 between the brackets 78 and 79 and clear of the brackets so it can move up and down as the valve 72 is seated or unseated, and a stop 85 holds the block 84 from swinging horizontally, and the block 84 has a bevelled cam face 87. A pivot pin 88 is mounted in the brackets 78 and 79 parallel with the stem 80. A cam head 89 is mounted upon the pivot pin and has a bevelled cam face 92 adapted to engage the cam face 87 and an operating handle or arm 93, so that when the arm 93 is moved one way the cam 92 moves away from the cam 87 and the valve 72 is free to operate and when the arm 93 is moved the other way the cam 92 presses down upon the cam 87 and resists the opening of the valve 72, as when it is desired to reduce the power of the engine by reducing the intake of air. At the same time the carburetor may be throttled to reduce the intake of fuel. The arms 93 may be connected together and connected to the carburetor control for simultaneous operation or there may be a separate handle for operating the controllers 76. The air controllers 76 combined with the carburetor control provide means for choking, for preventing spinning of the engine, for idling, and for general flexibility of control.

Thus I have produced an internal combustion engine which intakes fuel during the explosion cycle, intakes a double volume of air during the compression cycle, forces the two volumes of air into the explosion chamber at the end of the explosion stroke, forces the fuel into the explosion chamber during the compression stroke, and compresses the three intake volumes into one fuel charge.

I claim:

1. An engine having a primary piston, a double-acting secondary piston held stationary in the primary piston by a tubular stem, means whereby fuel is sucked through the tubular stem into the primary piston below the secondary piston during the explosion cycle and forced into the explosion chamber during the compression cycle, and means whereby air is sucked into the primary piston above the secondary piston during the compression cycle and forced into the explosion chamber at the end of the explosion cycle and ahead of the fuel.

2. An engine having a primary piston, a double-acting secondary piston held stationary in the primary piston by a tubular stem, means whereby fuel is sucked through the tubular stem into the primary piston below the secondary piston during the explosion cycle and forced into the explosion chamber during the compression cycle, means whereby air is sucked into the primary piston above the secondary piston during the compression cycle and forced into the explosion chamber at the end of the explosion cycle and ahead of the fuel, and means for controlling the air.

3. An engine having a crank case, an explosion chamber, a primary piston in the explosion chamber, a double-acting secondary piston in the primary piston, a tubular stem holding the secondary piston stationary, a carburetor in communication with the tubular stem, means whereby an intake of fuel is sucked through the tubular stem into the primary piston below the secondary piston during the explosion cycle and forced into the explosion chamber during the compression cycle, means whereby air is sucked into the crank case and into the primary piston above the secondary piston during the compression cycle and forced from the crank case and from the primary piston into the explosion chamber at the end of the explosion cycle.

4. An engine having a crank case, an explosion chamber, a primary piston in the explosion chamber, a double-acting secondary piston in the primary piston, a tubular stem holding the secondary piston stationary, a carburetor in communication with the tubular stem, means whereby an intake of fuel is sucked through the tubular stem into the primary piston below the secondary piston during the explosion cycle and forced into the explosion chamber during the compression cycle, means whereby air is sucked into the crank case and into the primary piston above the secondary piston during the compression cycle and forced from the crank case and from the primary piston into the explosion chamber at the end of the explosion cycle, and means for controlling the air.

5. An engine having a crank case, an explosion chamber, a primary piston in the explosion chamber, a double-acting secondary piston in the primary piston, a tubular stem holding the secondary piston stationary, a carburetor in communication with the tubular stem, means whereby an intake of fuel is sucked through the tubular stem into the primary piston below the secondary piston during the explosion cycle and forced into the explosion chamber during the compression cycle, means whereby air is sucked into the crank case and into the primary piston above the secondary piston during the compression cycle and forced from the crank case and from the primary piston into the explosion chamber at the end of the explosion cycle, check valves for holding the sucked-in air, a check valve for admitting the compressed air to the explosion chamber and holding the explosion, and means for resisting the action of the latter check valve so as to limit the flow of air to the explosion chamber and make an air resistance to the explosion stroke.

6. An engine having a cylinder with a piston bore, a port through the wall of the cylinder, a check valve in the port, a fuel passage from the check valve to the top of the cylinder, a mechanically operated valve at the upper end of the passage, a primary piston in the bore, a double-acting secondary piston in the primary piston, there being a port through the primary piston wall below the secondary piston adapted to register with the cylinder port, a hollow stem holding the secondary piston stationary and discharging through the secondary piston, an intake check valve in the secondary piston and controlling the passage from the hollow stem through the secondary piston, and a carburetor in communication with the hollow stem, so that when the primary piston goes down fuel is sucked into the primary piston below the secondary piston and when the primary piston goes up the fuel is forced through the ports and passage to the top of the bore.

7. An engine having a crank case, a cylinder upon the crank case, an air passage leading from the crank case to the top of the cylinder, a port through the wall of the cylinder to the passage, a check valve at the lower end of the passage, a check valve at the upper end of the passage, manual means for resisting the opening of the upper check valve, an inlet check valve for the crank case, a primary piston in the cylinder, a double-acting secondary piston in the primary piston, a port leading through the wall of the primary piston above the secondary piston and adapted to register with the port through the cylinder wall, and means for holding the secondary piston stationary in the primary piston, so that as the primary piston goes down air is forced into the top of the cylinder by the action of the primary and secondary pistons, the air being controlled by the manual means.

In testimony whereof I have signed my name to this specification.

HENRY RUEHMAN.